(12) United States Patent
Bittner

(10) Patent No.: US 9,187,045 B2
(45) Date of Patent: Nov. 17, 2015

(54) ROOFRAIL WITH FASTENING SYSTEM

(71) Applicant: Dura Operating, LLC, Auburn Hills, MI (US)

(72) Inventor: Norfried Achim Bittner, Wittenberg (DE)

(73) Assignee: Dura Operating, LLC, Auburn Hills, MI (US)

( * ) Notice: Subject to any disclaimer, the term of this patent is extended or adjusted under 35 U.S.C. 154(b) by 137 days.

(21) Appl. No.: 14/046,144

(22) Filed: Oct. 4, 2013

(65) Prior Publication Data

US 2014/0097218 A1    Apr. 10, 2014

Related U.S. Application Data

(60) Provisional application No. 61/709,652, filed on Oct. 4, 2012, provisional application No. 61/733,327, filed on Dec. 4, 2012.

(51) Int. Cl.
    *B60R 9/058*       (2006.01)
    *B60R 9/08*        (2006.01)
    *B60R 9/04*        (2006.01)
    *F16B 5/06*        (2006.01)

(52) U.S. Cl.
    CPC . *B60R 9/04* (2013.01); *B60R 9/058* (2013.01); *F16B 5/0664* (2013.01)

(58) Field of Classification Search
    CPC ............ B60R 9/04; B60R 9/058; B60R 9/08; B60R 9/048; F16B 5/0664
    See application file for complete search history.

(56) References Cited

U.S. PATENT DOCUMENTS

| | | | | |
|---|---|---|---|---|
| 3,724,730 | A | * | 4/1973 | Olsen et al. .................... 224/309 |
| 3,838,802 | A | * | 10/1974 | Grycel, III ..................... 224/309 |
| 4,765,522 | A | * | 8/1988 | Bell ................................ 224/326 |
| 5,069,377 | A | * | 12/1991 | Baughman ..................... 224/326 |
| 5,306,156 | A | * | 4/1994 | Gibbs et al. ...................... 439/34 |
| 5,497,925 | A | * | 3/1996 | Lumpe et al. .................. 224/326 |
| 5,617,981 | A | * | 4/1997 | Ricker et al. ................... 224/309 |
| 5,765,737 | A | * | 6/1998 | Cucheran et al. ............. 224/326 |
| 6,158,637 | A | * | 12/2000 | Fisch et al. ..................... 224/309 |
| 6,179,543 | B1 | * | 1/2001 | Adame et al. .................. 414/462 |

(Continued)

FOREIGN PATENT DOCUMENTS

DE           4240079 A1     6/1994
DE    102005014217 A1     9/2006

(Continued)

OTHER PUBLICATIONS

Extended Search Report for DE 13187130.3, Dated Sep. 10, 2014, pp. 1-7.

*Primary Examiner* — Brian D Nash
(74) *Attorney, Agent, or Firm* — Dinsmore & Shohl LLP

(57) ABSTRACT

A vehicle roof rail system includes a roof rail, a vehicle roof structure and a vehicle body structure. A tolerance compensator is disposed between the roof structure and the body structure. The tolerance compensator has an internal, oversized entry. The tolerance compensator includes an anchor fixing the tolerance compensator to the vehicle roof structure. A fastener passes through the oversized internal entry of the tolerance compensator linking the roof structure and body structure. An angle compensator is attached to the tolerance compensator. The angle compensator adjusts a contact angle of the tolerance compensator with the vehicle body structure.

26 Claims, 7 Drawing Sheets

(56) References Cited

U.S. PATENT DOCUMENTS

| | | | |
|---|---|---|---|
| 6,283,310 B1* | 9/2001 | Dean et al. | 211/20 |
| 6,350,095 B1* | 2/2002 | Gross et al. | 411/298 |
| 2005/0276677 A1* | 12/2005 | Andersson et al. | 411/551 |
| 2006/0012096 A1* | 1/2006 | Geldert | 269/203 |
| 2013/0062379 A1* | 3/2013 | Sautter et al. | 224/324 |

FOREIGN PATENT DOCUMENTS

| | | |
|---|---|---|
| DE | 202011103827 U1 | 5/2012 |
| EP | 2130722 A1 | 12/2009 |

\* cited by examiner

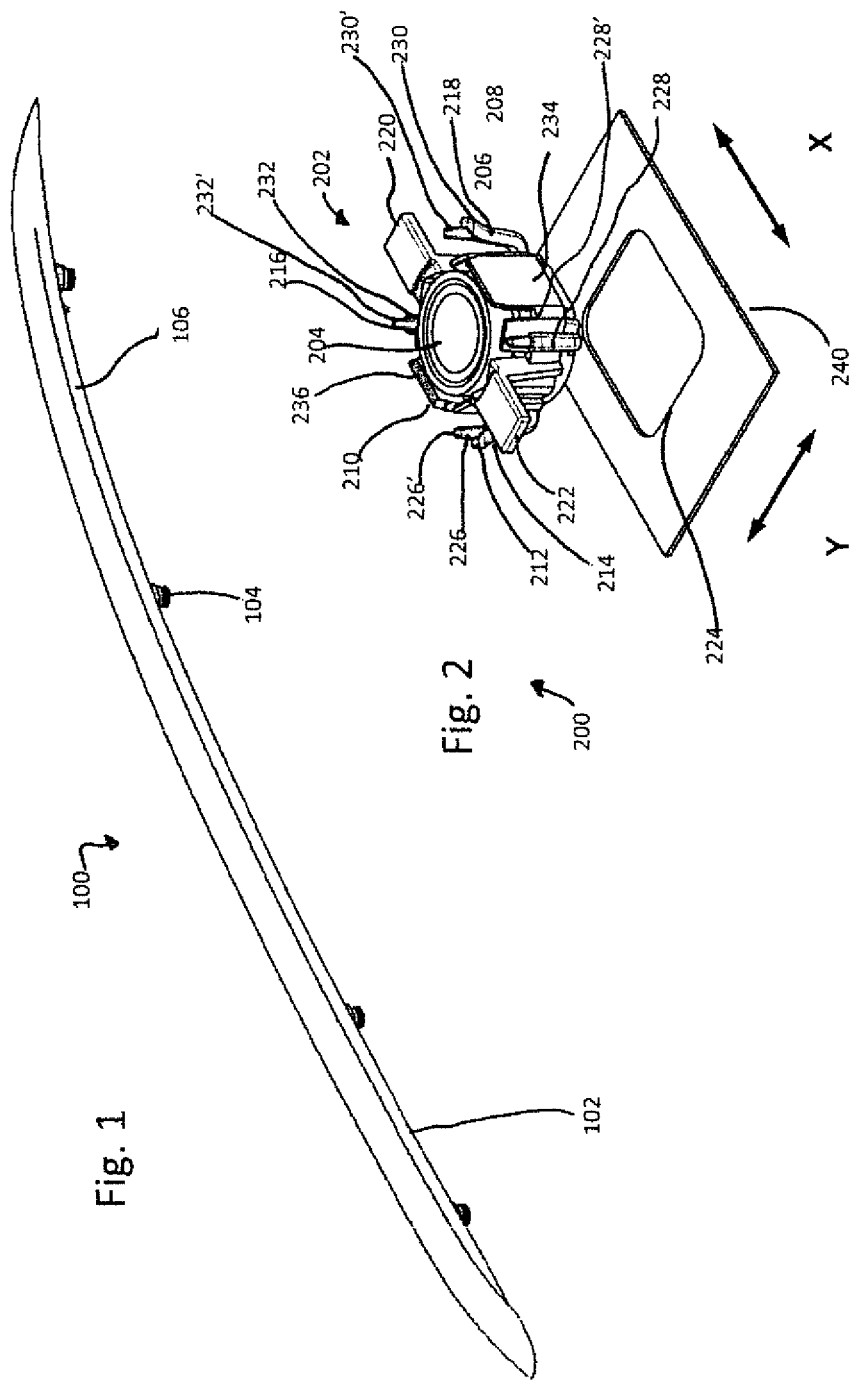

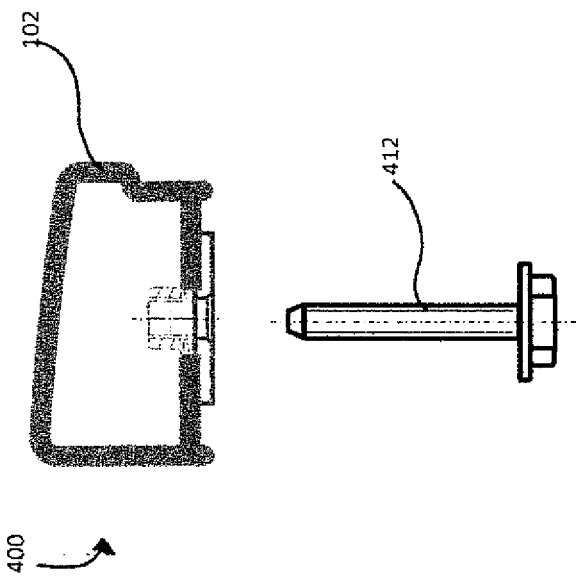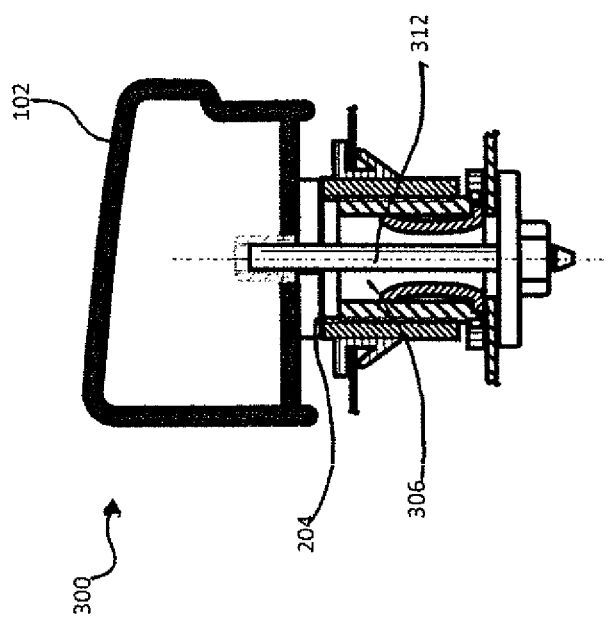

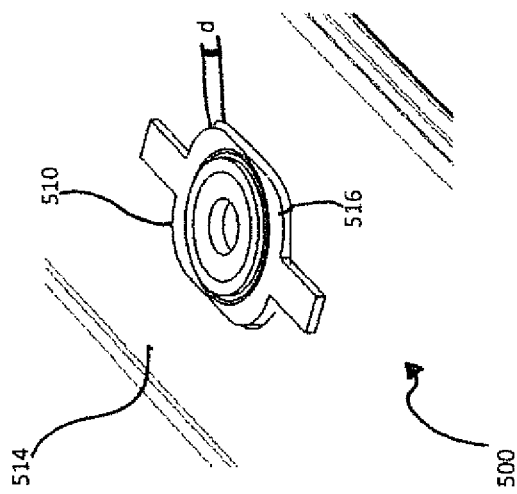
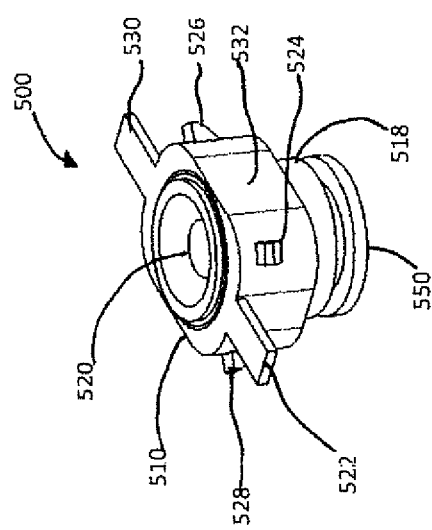

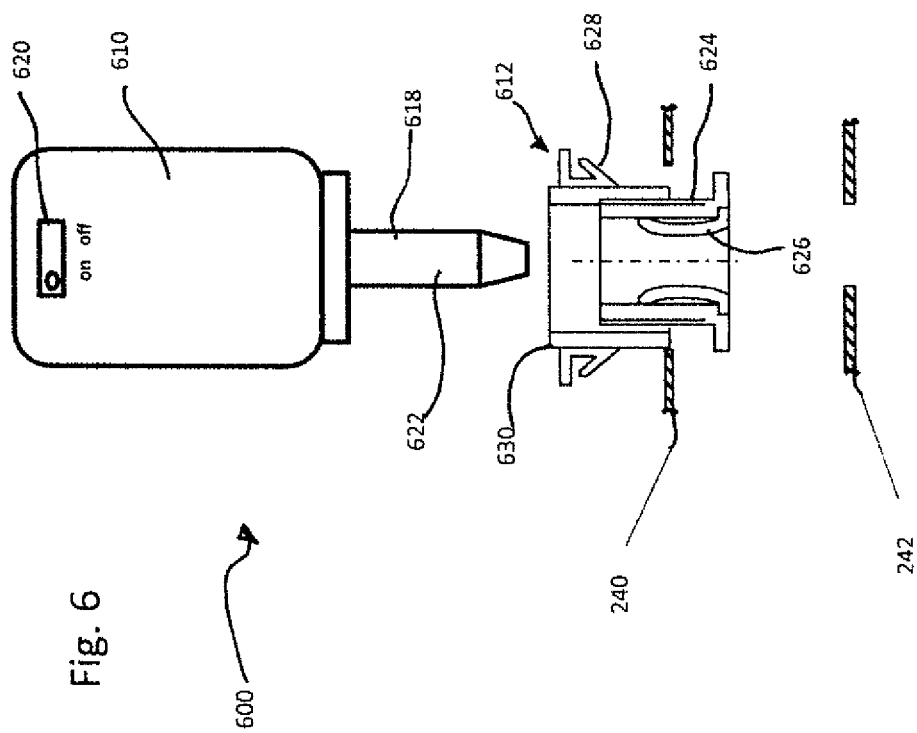

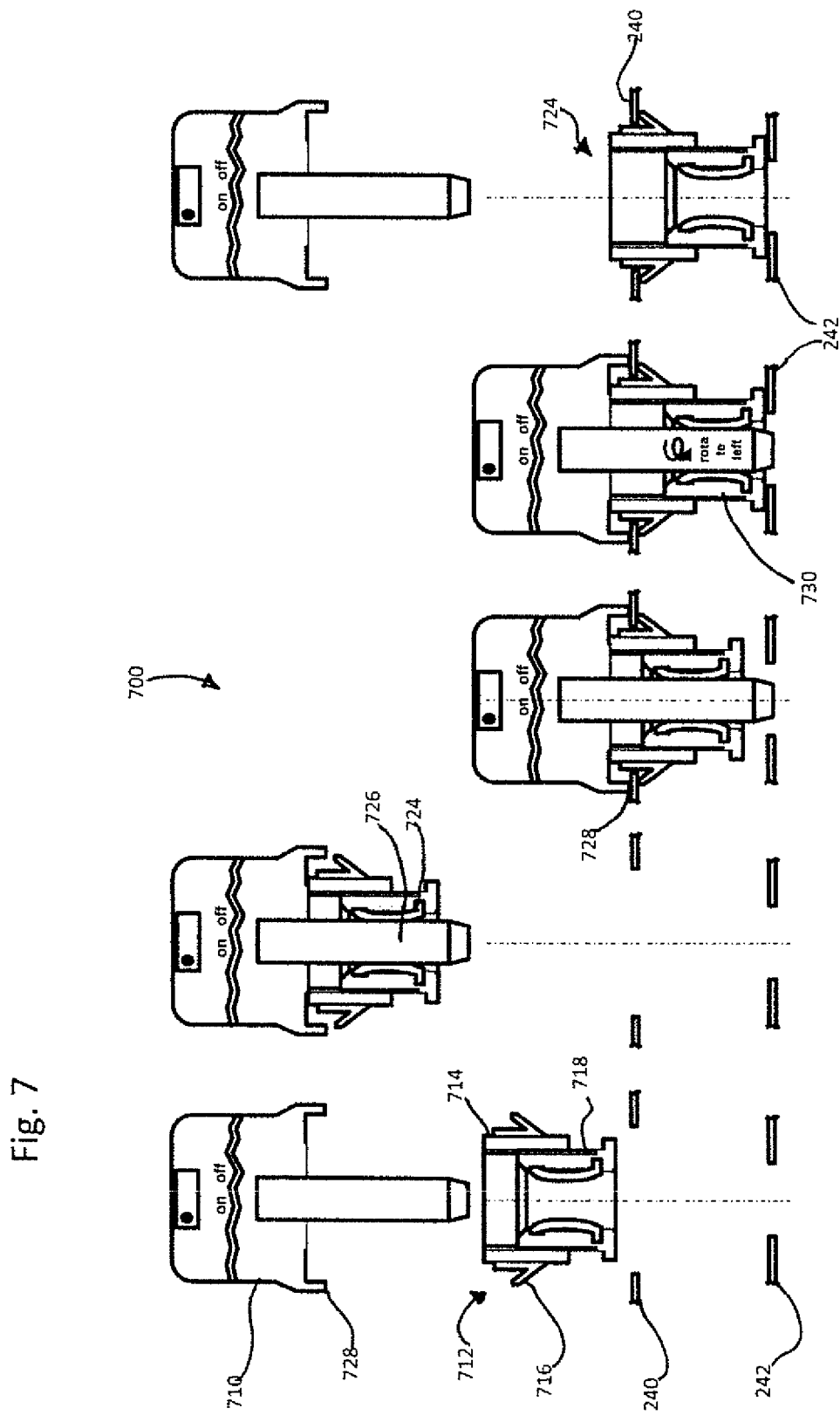

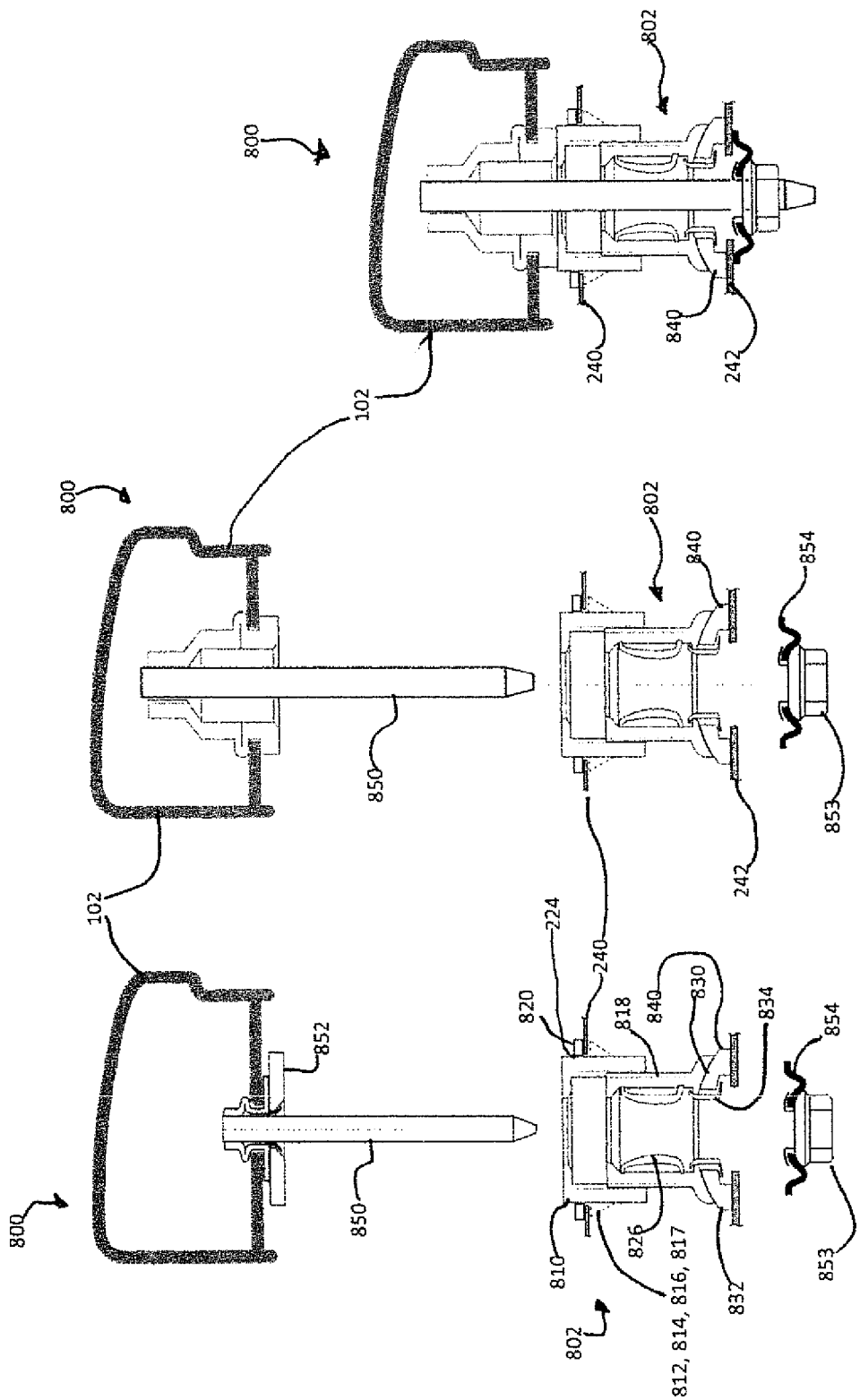

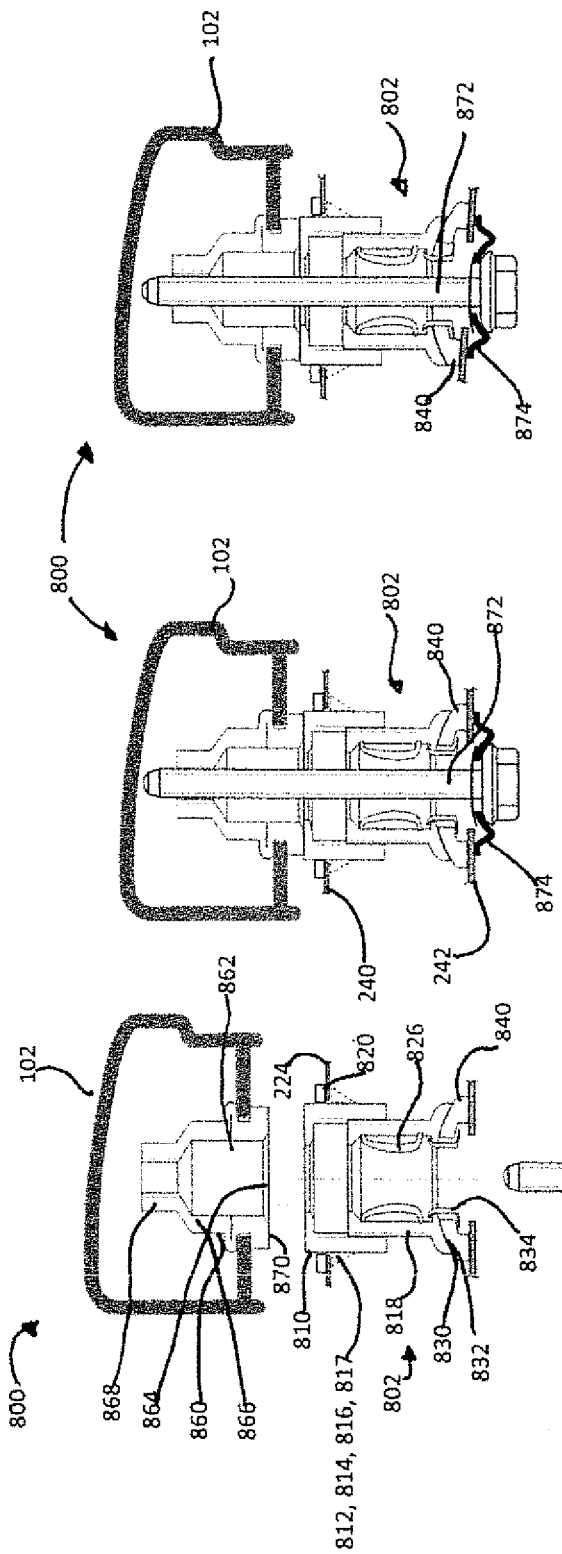

ROOFRAIL WITH FASTENING SYSTEM

CROSS-REFERENCE TO RELATED APPLICATIONS

This application claims priority of U.S. Provisional Patent Application Ser. No. 61/709,652, filed Oct. 4, 2012 and U.S. Provisional Patent Application Ser. No. 61/733,327 filed Dec. 4, 2012, both of which are incorporated herein by reference.

FIELD OF THE INVENTION

The present invention relates to roof rails for motor vehicles, and more particularly to roof rails that have a fastening system with tolerance compensation.

BACKGROUND OF THE INVENTION

Roof rails are popular on many types of vehicles. They offer both functionality for carrying loads and esthetics. Many roof rails are elongate structures that are attached to the roof of a vehicle via one or more fastening systems. In modem passenger vehicles the vehicle body and the roof overlap each other near the top edge of the vehicle. As such some fastening systems connect through both the vehicle roof and the body. To connect through both the vehicle body and the roof a tolerance compensator may be used as a means of fastening the roof rail to the roof without collapsing the roof/body separation.

Fastening devices with tolerance compensation and those that anchor into hollow structures are generally known: see for example U.S. Pat. No. 7,025,552 entitled "Assembly for Automatically Compensating Variations in the Spacing Between Two Structural Members"; U.S. Pat. No. 5,288,191 entitled "Device For the Clamping Attachment of Spaced Structural Parts"; U.S. Pat. No. 4,682,906 entitled "Device For the Clamping Connection of Structural Parts Which are Spaced From Each Other"; and U.S. Pat. No. 8,066,465 entitled "Fastening Device With Tolerance Compensation" the disclosures of which are incorporated herein by reference.

However what is needed is a roof rail with an attachment system that has tolerance compensation and is easier to install.

SUMMARY OF THE INVENTION

The present invention addresses the above mentioned problem(s) and/or others by providing a vehicle roof rail system including a roof rail and a tolerance compensator.

In one aspect of the improvements disclosed herein there is provided a vehicle roof; a vehicle body structure; a tolerance compensator disposed between the roof panel and the body structure, the tolerance compensator having an oversized entry.

In another aspect there is provided an anchor fixing the tolerance compensator to a vehicle structure, such as a roof panel or body structure.

In another aspect there is provided a roof rail system including a tolerance compensator having an anchor fixed to a vehicle structure and a fastener passing through the vehicle structure through an oversized entry.

Other improvement features that may form part of the system together or separately include an anchor having a snap fit to the roof panel with an insertion force that is lower than its extraction force, a tolerance compensator with various blocks; and a tolerance compensator having an oversized entry. In various embodiments of the roof rail system, the roof rail may have a curved base. Part of the system may include a vehicle roof with a hole section having a size larger than the outer diameter of the tolerance compensator, the size of the tolerance compensator being less than 1 mm wider than the nominal gap. In another aspect of the improvements disclosed herein there may be provided a tolerance compensator with a plurality of lateral blocks that limit lateral movement of the tolerance compensator within a hole section of the roof panel to less than 1 mm in either the x or y directions while an anchor prevents movement in the z direction.

In another aspect disclosed herein the vehicle roof rail system may comprise a roof rail; a plurality of tolerance compensators, each tolerance compensator having a fixed member with a threaded portion, an expander with a threaded portion mated to the threaded portion of the fixed member, a pass through bore and an oversized entry, the tolerance compensator having an anchor with a plurality of upper roof panel blocks and a plurality of blocks. In various embodiments the blocks may include blocks that span a diameter larger that a predetermined size of an intended roof hole, the blocks having flexible arms that can flex to an outer diameter size of less than the roof hole; and a plurality of fasteners spaced along the length of the roof rail, each fastener having a shaft with an outer diameter smaller than the inner diameter of the oversized entry.

Disclosed herein is also a novel method of installing a roof rail to a vehicular roof. The method includes connecting a tolerance compensator to a rotary tool or to a vehicle structure. The method may include inserting the tolerance compensator into a hole in a vehicular roof until an anchor of the tolerance compensator engages the roof structure or body structure; activating the rotary tool to expand the tolerance compensator until the expander contacts the body structure; removing the rotary tool; and attaching the roof rail to the vehicle roof with a fastener disposed through the tolerance compensator. The fastener may be a bolt. The method of installing a roof rail may include a tolerance compensator having an inner wall inner diameter that is larger than the shaft of the roof rail fastener. The tolerance compensator may alternatively lack a vertical block that prevents over-insertion of the tolerance compensator.

For a more complete understanding of the claimed invention, reference is now made to the accompanying drawings and the following detailed description of various embodiments.

BRIEF DESCRIPTION OF THE DRAWINGS

FIG. 1 is a perspective view of a roof-rail system;

FIG. 2 is an environmental view of a fastening system above a panel;

FIG. 3 is a cross-sectional view of a roof-rail and fastening system;

FIG. 4 is a cross-sectional view of a roof-rail and an alternative fastening system;

FIGS. 5a and 5b is a perspective view of a roof-rail fastening system in a roof panel;

FIG. 6 is a perspective view of a roof-rail fastening system;

FIG. 7 is time line view of a roof-rail fastening system;

FIG. 8A-C are sectional views of a roof-rail fastening system;

FIG. 9A-C are sectional views of a roof-rail fastening system.

DETAILED DESCRIPTION OF THE PREFERRED EMBODIMENTS

With reference to FIGS. 1 and 2, shown therein are a roof rail system 100 and a fastening system 200. The roof rail system 100 includes a roof rail 102 and a fastener 104. The fastener may include a nut and bolt system. The roof rail may include a bolt fixed to the base of the roof rail. The roof rail may also include a tapped insert for connecting to a bolt. Footpads, seals and other hardware may also support the installation of the roof rail to a vehicle roof.

The fastening system may include a tolerance compensator 202. The tolerance compensator 202 may be inserted between one or more structures and adjusted to take-up variability in distance between such structures. For example, the tolerance compensator 202 may be inserted between a roof structure 240 and a body structure 242, such as a roof panel 240 and a body structure 242. The systems 100, 200 can be combined to provide a connection of the roof rail 102 to the vehicle roof 240.

As may be appreciated from the disclosures contained herein, among other things, a roof rail system 100 can be located into fixture locations without having to independently move and realign the tolerance compensators 202 after the tolerance compensator 202 is attached to the roof panel 240. Such an improvement is particularly useful for one or more of assembly line operations, blind attachments, roof rails with a multitude of fasteners, and/or curved roof rails which may have fasteners which are difficult to align.

A tolerance compensator 202 may be any suitable tolerance compensating device. In one form of the improvements disclosed herein, the tolerance compensator 202 has an over-sized entry 204 for a pass-through fastener 104. The oversized entry 204 may lead to a through-bore 306. An over-sized entry 204 is one that is sized to provide free clearance of an insert, such as a fastener insertion tip or other insert. The over-sized entry 204 may be a column of an essentially uniform shape. Alternatively the over-sized entry 204 may be comprised of a funnel shape, such as an expanded opening that tappers to a through-bore 306. A tolerance compensator 202 with an over-sized opening 204 can provide a means of fastening the roof rail 102 to the roof 240 without collapsing the roof/body separation and without having to move the compensator 202 after anchoring it when fixturing to the roof rail 102. As the case may be, a pass through fastener 104 may be sized with a shaft having an outer diameter that is sufficiently smaller than the through-bore 306 inner diameter to avoid simultaneous side to side contact along the inner diameter.

The tolerance compensator 202 may have at least two portions that move relative to one another to compensate for variation. The first portion may be a fixed portion 206. The fixed portion 206 may be attached to an anchor 208. The anchor 208 may block the tolerance compensator 202 from being removed from a seated position or alternatively may both block the compensator 202 from being removed from the seated position and over inserted into the seated position. The second portion may be an expander 210 that moves relative to the fixed portion 206. The movement of the expander 210 may be provided by engaging threads between the fixed portion 206 and the expander 210 whereupon rotation of the expander 210 causes movement of the expander 210 relative to the fixed portion 206. In an extended condition the fixed portion 206 can engage a first structure, such as a roof panel 240 while the expander 210 can engage a second structure, such as a body structure 242. As such, an expander 210 together with a fixed portion 206 can span the gap between roof 240 and body 242 which distance may vary between vehicles.

The anchor 208 may be any suitable anchoring device. The anchor 208 may include one or more attachments and/or blocking features for attaching and/or positioning the tolerance compensator in a section of a vehicle roof 240 or a vehicle body 242. The anchor may be a snap fit attachment.

The anchor 208 may include one or more extraction blocks 226, 228, 230, 232. As shown there are four extraction blocks 226, 228, 230, 232. The extraction block(s) may include ledges that are shaped to receive edges of the roof panel 240. The extraction blocks may also include one or more retaining blocks 226', 228', 230', 232' shaped and positioned to restrain the tolerance compensator 202 from sliding under or past the panel edges that form the hole section 224 of a mounting structure. As shown the retaining block 226, 228, 230, 232 is a vertical block connected to or made integral with the extraction block 226', 228', 230', 232'.

The tolerance compensator 202 and/or anchor 208 may include one or more over-insertion blocks 220, 222. Over-insertion blocks 220, 222 may be positioned against a panel or other structure to prevent the tolerance compensator 202 from being inserted too far into the structure or past the seated position.

The tolerance compensator 202 and/or anchor 208 may include one or more lateral blocks 234, 236. Lateral blocks 234, 236 may be shaped and positioned to limit lateral movement of the tolerance compensator 202 within the roof hole section 224. In a preferred embodiment the lateral movement is limited to less than 1 mm. Limiting the lateral movement of the tolerance compensator 202 to and fore and/or side to side (together as the x-y axis) fixes the range of potential positions of the over-sized entry 204. Limiting the range of potential positions can allow ease of assembly while compensating for manufacturing tolerance stack-up.

The anchor 208 may include one or more resilient arms 212, 214, 216, 218. The resilient arms 212, 214, 216, 218 may have a span that provides an interference fit to the roof structure 240. The resilient arms 212, 214, 216, 218 may diverge from the main body of the tolerance compensator 202 at an angle. The angle may progress from an initial span smaller than a hole section 224, through a curved portion with a span larger than the hole section 224, to a resting ledge 229 which has a span smaller than the maximum span of the resilient arm 212, 214, 216, 218. The resting ledge 229 of the anchor 208 may be situated under the edges of the panel to block the tolerance compensator 202 from being pulled out of the hole section B24. In one aspect, the resilient arms 212, 214, 216, 218 extend at an angle from the anchor 208 such that the angle which the resilient arms diverge from the main body increases in a vertical direction upward in relation to the insertion of the tolerance compensator into the roof hole in a downward direction. The resilient arms 212, 214, 216, 218 flex about a vertical or Z axis as shown in FIG. 2.

As shown the extraction blocks 226, 228, 230, 232 may be integral with the resilient arms 212, 214, 216, 218 and provide the resting ledges 229. The retaining block(s) 226', 228', 230', 232' may be extended in length to provide an extractor 231. As shown by way of one example, the extractor 231 may be a tab sized to allow compression of the resilient arms and removal of the tolerance compensator 202 from a seated position in the hole section 224 without damaging the resilient arms.

In practice the tolerance compensator 202 may be inserted into a structure with a force sufficient to flex the resilient arms 212, 214, 216, 218 of the anchor 208 until an upper part of the resilient arms 212, 214, 216, 218 retract, reaching an insertion point at which the resting ledges 229 move into position to secure the tolerance compensator 202. If desired, the extractors 231 can be pressed to flex the resilient arms 212, 214, 216, 218 so that the tolerance compensator 202 can be removed without damage to the anchor 208.

Connections of the roof rail 102 to the roof 240 may be made in various ways. For example, referring now to FIG. 3 and FIG. 4, shown in these two drawings at 300, 400 are optional embodiments of fastening systems, one which has a bolt 312 pre-connected to a roof rail 102 and one which includes a bolt 412 separate from the roof rail 102 for connection to a roof rail 102 after it is positioned above a roof structure. As used herein bolt/nut includes a variety of bolt nut fastening systems, including rivet-nut systems, etc.

Referring now to FIGS. 5a and 5b, shown in these drawings is another embodiment of a tolerance compensator 500. The tolerance compensator 500 is shown in both a seated position in a vehicle structure 514 and separately 500. The tolerance compensator 500 as shown herein includes a fixed member 510 made of a unitary piece. The unitary fixed piece may be made out of any suitable material, including plastic. In the case of plastic, the main body of the fixed piece may include the various blocks and other structures as described above in other embodiments, including one or more over-insertion blocks 522, 530, one or more extraction blocks 524, 526, 528, etc. The tolerance compensator includes an expander 518. The expander 518 may have an oversized entry 520. The expander 518 may include a boot 550 for engaging the body panel which together with the fixed member spans the distance between the roof panel 240 and the body panel 242. As show in FIG. 5b, the panel hole section 224 is slightly larger than the main body 510 of the tolerance compensator 220 by a distance "d". Distance d is preferably less than 1 mm.

Referring now to FIG. 6, shown therein at 600 is a system for installing a tolerance compensator 612 between a roof structure 240 and a body structure 242, the system including a tool 610 for installing the tolerance compensator between the structures. The tolerance compensator 612 includes a fixed portion 630 with an anchor 628 and an expander 624. The anchor 628 may be a clip, such as a snap fit connector. The anchor 628 may also be fitted with one or more blocks as described in the other embodiments above. The anchor 628 may be molded to the fixed portion or may be a cage that fits around the fixed portion 630. The tool 610 includes an adaptor 618 for receiving the tolerance compensator 612 and an actuator 620 for expanding and/or retracting the tolerance compensator 612 while anchored to a vehicle structure. As shown, the tool adaptor includes a shaft 622 and the expander 624 includes a compression fitting 626 sized for the shaft with an interference fit.

Referring now to FIG. 7, generally shown therein at 700 is another method for installing a roof rail fastening system with a tolerance compensator 712 between two vehicle structures 720, 722. The system 700 includes a tool 710 and a tolerance compensator 712. The two vehicle structures may be a roof panel 240 and a body structure 242. As shown, the tolerance compensator 712 includes a fixed member 714 with an anchor 716 and an expander 718 connected to the fixed member 714. The anchor 716 may be attached to the fixed member 714 or made integrally therewith. As shown in this example, the anchor 716 does not include an over-insertion block, which is instead provided by the tool having an over-insertion block 728. The expander 718 may include a threaded portion with right or left handed threads that can translate the expander 718 in relation to the fixed member 714 upon rotation of the expander 718. The tool 710 can then be used to move the expander 718 in an amount sufficient to bridge the distance between the roof panel 240 and the body panel 242. A roof rail 102 can then be attached to the roof structure 240 via a fastener that passes through the roof panel 240, the tolerance compensator 712 and the body structure 242.

In practice one can install a roof rail system to the roof of a vehicle via one or more steps as followed (in no particular order). A hole section 224 is provided in the roof panel 240 of a vehicle. A tolerance compensator as described in any of the embodiments is connected to a rotary tool. The tolerance compensator is inserted into the hole section 224 of the roof panel 240 until the anchor of the fixed member engages the roof panel 240. The tool supports the tolerance compensator until the tolerance compensator is expanded to span the gap between the roof panel 240 and the body structure 242. The tool is then removed from the tolerance compensator. A roof rail 102 with a fastener 104 is provided. A bolt is passed through the tolerance compensator and a bolt, washer or other fixing device is provided on the fastener to secure the roof rail 102 in place. Alternatively, the tolerance compensator may be attached to the roof structure 240 prior to engaging the tool.

Referring to FIG. 8A-C there is shown another alternative embodiment of a roof rail system 800 and tolerance compensator 802. In the depicted embodiment, the tolerance compensator 802 includes fixed member 810 made of a unitary piece. The unitary fixed piece may be made out of any suitable material, including plastic. In the case of plastic, the main body of the fixed piece may include the various blocks and other structures as described above in other embodiments, including, one or more extraction blocks 824, 826, 828, etc. The tolerance compensator 802 includes an expander 818. The expander 818 may have an oversized entry 820, as previously described above. Additionally, the expander 818 may include a compression fitting 826 as described above. In another aspect, the panel hole section 224 is slightly larger than the main body 810 of the tolerance compensator 802 by a distance d that is preferably less than 1 mm. In one aspect, the resilient arms 812, 814, 816, 817 extend at an angle from the anchor 808 such that the angle which the resilient arms 812, 814, 816, 817 diverge from the main body 810 increases in a vertical direction upward in relation to the insertion of the tolerance compensator 802 into the hole section 224 in a downward direction. The resilient arms 812, 814, 816, 817 flex about a vertical or Z axis.

The tolerance compensator 802 may include an angle compensator 840. An angle compensator 840 can be used to take up variation in vertical alignment. The angle compensator 840 may include a slide 841. The angle compensator 840 may be attached to the expander 818. In the embodiments shown, the angle compensator 840 includes a slide 841 with a curved surface that can adjust when seated on an angular surface in relation to a vertical insertion direction.

The expander 818 may include a curved or angled attachment section 830 that mates with a corresponding curved or angled portion 832 of an angle compensator 840. In one aspect, the expander 818 may be coupled to the angle compensator 840 utilizing an attachment ring 834. In one aspect the expander 818 may include ledge structures 820, 822 that allow the attachment ring 834 to seat in the expander 818 and angle compensator 840. The attachment ring 834 or other attachment structure allows for sliding movement of the curved surface 832 of the angle compensator 840 on the curved surface 830 of the expander 818 such that an angle of contact of the tolerance compensator 802 with the vehicle body structure 242 is adjusted. In this manner, angular tolerances associated with the body structure 242 may be accommodated for a secure attachment of the roof rail 102 to the body structure 242. In an alternative aspect, the compression fitting 826 may be formed in one piece with a section that connects the expander 818 to the angle compensator 840 or may have a separate connection ring 834 as previously described.

The roof rail 102 and tolerance compensator 802 structure of the alternative embodiment of FIGS. 8A-C includes various connections of the roof rail 102 to the roof 242 and body structure 242. In the embodiment depicted in FIG. 8A the roof rail 102 may include a rivet stud 850 that is crimped onto a washer 852 and attached to the roof rail 102. In the embodiment depicted in FIG. 8B, the connection may include a one piece rivet stud 850 attached to the roof rail 102 that does not include the washer in FIG. 8A. The washer 852 and rivet stud may act as a bearing surface for the tolerance compensator 802. Various rivet studs 850 may be attached to the roof rail 102 and serve as a connection of the roof rail 102, roof 240 and body structure 242. The rivet stud 850 may be connected to a nut 853 that couples the roof rail 102, tolerance compensator 802, roof 240 and body structure 242 to form a roof rail system.

In one aspect, the nut 853 may include an angle compensating washer 854. The nut 853 including the angle compensating washer 854 connects to the rivet stud 850 on an opposing side of the body structure 242 in relation to the angle compensator 840. In this manner the angle compensating washer 854 contacts the body structure 242 to accommodate an angle of the body structure 242 on both sides of the body structure 242 in conjunction with the angle compensator 840.

Alternatively, as shown in the embodiment of FIGS. 9A-C, the roof rail 102 may include a rivet nut 860 attached to the roof rail 102. The rivet nut 860 includes a bore 862 formed therein. The bore 862 includes an oversized bore section 864 connected to an angled portion 866 that terminates at an attachment section 868. In one aspect, the rivet nut 860 includes a bearing surface 870 that mates with the tolerance compensator 802. In this embodiment, a bolt or fastener 872 is fed from the body panel 242 to the roof rail 102. In one aspect, the fastener 872 includes an angle compensator washer 874. As with the previously described embodiment of FIG. 8, the angle compensating washer 874 of the fastener 872 contacts the body structure 242 on an opposing side of the body structure 242 in relation to the angle compensator 840.

While the improvements have been illustrated in detail in the drawings and the foregoing description, the same is to be considered as illustrative and not restrictive in character. What are included in the descriptions above are, among other things, various rail and rail attachment systems that permit a rail having a fastener to be attached to a vehicular roof by fixing the locations of a series of tolerance compensators relative to a set of holes and inserting fasteners into oversized entry holes. Such systems can alleviate the need to adjust the position of the tolerance compensators at the time of installing the roof rail. Therefore, it should be understood that only example embodiments have been shown and described fully and that each of the features presented can be used separately or combined on an element by element basis as needed for the intended application.

The invention claimed is:

1. A vehicle roof rail system comprising:
a roof rail;
a vehicle roof structure;
a vehicle body structure separated from the vehicle roof structure by a predefined distance;
a tolerance compensator disposed between the roof structure and the body structure and spanning the predefined distance, the tolerance compensator having an internal, oversized entry;
an anchor fixing the tolerance compensator to the vehicle roof structure;
a fastener passing through the oversized internal entry of the tolerance compensator linking the roof structure and body structure;
an angle compensator attached to the tolerance compensator, the angle compensator adjusting a contact angle of the tolerance compensator with the vehicle body structure.

2. The vehicle roof rail system of claim 1, wherein the anchor has a snap fit to the roof structure with an insertion force that is smaller than the extraction force.

3. The vehicle roof rail system of claim 1, wherein the tolerance compensator has at least one lateral block which limits either cross-car or fore-aft movement of the tolerance compensator about the roof structure.

4. The vehicle roof rail system of claim 1, wherein the tolerance compensator has at least one retaining block.

5. The vehicle roof rail system of claim 1, wherein the at least one resilient arm that engages the roof structure with an interference fit and limits lateral movement of the tolerance compensator within a hole section of the roof panel to less than 1 mm in either the cross-car or fore-aft directions.

6. The vehicle roof rail system of claim 1, wherein the resilient arms flex about a vertical or Z axis.

7. The vehicle roof rail system of claim 1, wherein the vehicle roof structure further includes a hole section with a size larger than the outer diameter of the tolerance compensator by less than 1 mm wider but a size greater than the outer diameter of the at least one lateral block.

8. The vehicle roof rail system of claim 1, wherein the tolerance compensator has a plurality of lateral blocks that limit lateral movement of the tolerance compensator within a hole section of the roof structure to less than 1 mm in either cross-car or fore-aft directions.

9. The vehicle roof rail system of claim 1, wherein the tolerance compensator has at least one extraction block connected to at least one resilient arm.

10. The vehicle roof rail system of claim 1, wherein the anchor includes a fixed member and an expander connected to the fixed member.

11. The vehicle roof rail system of claim 10, wherein the expander includes an oversized entry.

12. The vehicle roof rail system of claim 10 wherein the expander includes a curved attachment section.

13. The vehicle roof rail system of claim 12 wherein the angle compensator includes a curved movement section, the curved movement section sliding on the curved attachment section.

14. The vehicle roof rail system of claim 1 wherein the anchor includes a through bore having a compression fitting.

15. The vehicle roof rail system of claim 1 wherein the roof rail includes a rivet stud attached thereon and further including a corresponding nut having an angle compensator washer.

16. The vehicle roof rail system of claim 15 wherein the angle compensator contacts the body structure on one side of the body structure and the nut having the angle compensating washer contacts the body structure on an opposing side of the body structure.

17. The vehicle roof rail system of claim 15 wherein the rivet stud includes a crimped on washer bearing against the tolerance compensator.

18. The vehicle roof rail system of claim 15 wherein the rivet stud includes a bearing surface bearing against the tolerance compensator.

19. The vehicle roof rail system of claim 1 wherein the roof rail includes a rivet nut attached thereon and further including a corresponding fastener having an angle compensator washer.

20. The vehicle roof rail system of claim 19 wherein the angle compensator contacts the body structure on one side of the body structure and the fastener having the angle compensating washer contacts the body structure on an opposing side of the body structure.

21. The vehicle roof rail system of claim 19 wherein the rivet nut includes a bore formed therein, the bore including an oversized bore section connected to an angled portion that terminates at an attachment section.

22. The vehicle roof rail system of claim 19 wherein the rivet nut includes a bearing surface therein that mates with the tolerance compensator.

23. A vehicle roof rail system comprising:
a roof rail;
a vehicle roof structure;
a vehicle body structure;
a tolerance compensator disposed between the roof structure and the body structure, the tolerance compensator having an internal, oversized entry;
an anchor fixing the tolerance compensator to the vehicle roof structure, the anchor including a fixed member and an expander connected to the fixed member;
a fastener passing through the oversized internal entry of the tolerance compensator linking the roof structure and body structure;
an angle compensator attached to the tolerance compensator, the angle compensator adjusting a contact angle of the tolerance compensator with the vehicle body structure.

24. A vehicle roof rail system comprising:
a roof rail;
a vehicle roof structure;
a vehicle body structure;
a tolerance compensator disposed between the roof structure and the body structure, the tolerance compensator having an internal, oversized entry;
an anchor fixing the tolerance compensator to the vehicle roof structure;
a fastener passing through the oversized internal entry of the tolerance compensator linking the roof structure and body structure;
an angle compensator attached to the tolerance compensator, the angle compensator adjusting a contact angle of the tolerance compensator with the vehicle body structure wherein the roof rail includes a rivet nut attached thereon and further including a corresponding fastener having an angle compensator washer.

25. A vehicle roof rail system comprising:
a roof rail;
a vehicle roof structure;
a vehicle body structure;
a tolerance compensator disposed between the roof structure and the body structure, the tolerance compensator having an internal, oversized entry;
an anchor fixing the tolerance compensator to the vehicle roof structure;
a fastener passing through the oversized internal entry of the tolerance compensator linking the roof structure and body structure;
an angle compensator attached to the tolerance compensator, the angle compensator adjusting a contact angle of the tolerance compensator with the vehicle body structure wherein the roof rail includes a rivet nut attached thereon and further including a corresponding fastener having an angle compensator washer wherein the roof rail includes a rivet stud attached thereon and further including a corresponding nut having an angle compensator washer wherein the angle compensator contacts the body structure on one side of the body structure and the nut having the angle compensating washer contacts the body structure on an opposing side of the body structure.

26. A vehicle roof rail system comprising:
a roof rail;
a vehicle roof structure;
a vehicle body structure;
a tolerance compensator disposed between the roof structure and the body structure, the tolerance compensator having an internal, oversized entry;
an anchor fixing the tolerance compensator to the vehicle roof structure;
a fastener passing through the oversized internal entry of the tolerance compensator linking the roof structure and body structure;
an angle compensator attached to the tolerance compensator, the angle compensator adjusting a contact angle of the tolerance compensator with the vehicle body structure and wherein the tolerance compensator has at least one resilient arm that engages the roof structure, the at least one resilient arm extending at an angle from the anchor such that the angle which the resilient arms diverge from a main body increases in a vertical direction in relation to the insertion of the tolerance compensator into the roof structure.

* * * * *